US006980492B2

(12) United States Patent
Wei

(10) Patent No.: US 6,980,492 B2
(45) Date of Patent: Dec. 27, 2005

(54) MAGNETICALLY SUSPENDED CD-ROM DRIVE

(75) Inventor: Jin-Chuan Wei, Taipei (TW)

(73) Assignee: Inventec Corporation, Taipei (TW)

( * ) Notice: Subject to any disclaimer, the term of this patent is extended or adjusted under 35 U.S.C. 154(b) by 516 days.

(21) Appl. No.: 10/209,375

(22) Filed: Jul. 30, 2002

(65) Prior Publication Data

US 2003/0123340 A1 Jul. 3, 2003

(30) Foreign Application Priority Data

Dec. 28, 2001 (TW) .............................. 90132704 A

(51) Int. Cl.7 ............................................... G11B 21/08
(52) U.S. Cl. .................................... 369/30.36; 720/601
(58) Field of Search .......................... 369/30.27, 30.36, 369/75.2, 75.1, 77.2, 77.1; 720/601, 602, 720/613

(56) References Cited

U.S. PATENT DOCUMENTS

| | | | |
|---|---|---|---|
| 6,049,520 A * | 4/2000 | Bassett | 369/266 |
| 6,745,946 B2 * | 6/2004 | Van Rosmalen et al. | 235/493 |
| 2003/0007285 A1 * | 1/2003 | Emberty et al. | 360/98.06 |

* cited by examiner

*Primary Examiner*—Tan Dinh
(74) *Attorney, Agent, or Firm*—Fulbright & Jaworski LLP

(57) ABSTRACT

A magnetically suspended CD-ROM drive is proposed, which is characterized by using electromagnetic attraction/repulsion force to move a disc-holding support tray for loading or ejecting a compact disc into or out of the CD-ROM drive. Without employing a gear mechanism of a conventional CD-ROM drive for mechanically operating the support tray, this magnetically suspended CD-ROM drive is beneficial as not having to install additional equipment such as a read/write head moving device, thereby making fabrication processes and equipment maintenance more cost-effective to implement.

6 Claims, 4 Drawing Sheets

MAGNETICALLY SUSPENDED CD-ROM DRIVE

FIELD OF THE INVENTION

The present invention relates to CD-ROM drives, and more particularly, to a magnetically suspended CD-ROM drive having a support tray for holding a compact disc.

BACKGROUND OF THE INVENTION

A conventional CD-ROM drive is generally designed to contain a gear mechanism and a motor for mechanically rotating the gear mechanism to execute loading-in or ejecting-out of a compact disc.

FIG. 1 illustrates basic components of a conventional CD-ROM drive. As shown in the drawing, the conventional CD-ROM drive 1 comprises: a support tray 11, a disc loading switch 12, a loading/ejecting motor 13, a gear mechanism 14, an electronic circuit 15, a read/write head module 16, a disc ejecting switch 17, a read/write head moving device 18 and a read/write head 19. In operation of the CD-ROM drive 1 for disc loading, first, a compact disc is placed on the support tray 11 used for disc holding; next, a disc loading button is pressed or the support tray 11 is pushed into the CD-ROM drive 1. This then activates the disc loading switch 12, and in turn triggers a forward rotation of the loading/ejecting motor 13, which would associatively rotate the gear mechanism 14 to move the support tray 11 into the CD-ROM drive 1. When the support tray 11 reaches a predetermined loading position, the electronic circuit 15 stops the loading/ejecting motor 13, and allows the read/write head module 16 to start reading the compact disc.

For disc ejection from the CD-ROM drive 1, first, a disc ejecting button is pressed to activate the disc ejecting switch 17, and in turn trigger a reverse rotation of the loading/ejecting motor 13, which would correspondingly drive the gear mechanism 14 to eject the support tray 11 out of the CD-ROM drive 1. When the support tray reaches a predetermined ejecting position, the electronic circuit 15 stops the loading/ejecting motor 13 and allows the compact disc to be removed from the support tray 11. After that, the support tray 11 is again pushed back into the CD-ROM drive 1.

Before disc loading or after disc ejecting, the read/write head module 16 e.g. optical-lens read/write module, mechanically operates the read/write head moving device 18 to elevate the read/write head 19. As such, when the support tray 11 is readily held in position inside the CD-ROM drive 1, the read/write head moving device 18 would lower the read/write head 19 to a level where the read/write head 19 can proceed to read the compact disc.

However, the above conventional CD-ROM drive has significant drawbacks. First, the loading/ejecting motor and the gear mechanism occupy considerable space; thereby the CD-ROM drive is hardly made more compact in size. Moreover, the additional assembly of a read/write head moving device, not only undesirably increases material and fabrication costs, but also requires extra work of device adjustment and maintenance. In addition, mechanical mode of operation for the CD-ROM drive tends to malfunctions or breakdowns with higher chance. And, the gear mechanism is easily damaged, thereby degrading the lifetime of the CD-ROM drive; the gear mechanism is cost-ineffectively manufactured and assembled, and damaged gear mechanism is hardly repaired, making fabrication and maintenance costs both greatly increased for the conventional CD-ROM drive.

Therefore, how to develop a CD-ROM drive that can effectively eliminate the above drawbacks or problems, is a significant topic to be herewith discussed.

SUMMARY OF THE INVENTION

A primary objective of the present invention is to provide a magnetically suspended CD-ROM drive, which uses magnetic attraction and repulsion forces to move a support tray for loading and/or ejecting a compact disc held on the support tray, without having to employ a mechanically-driven gear mechanism and a read/write head moving device of a conventional CD-ROM drive.

Another objective of the invention is to provide a magnetically suspended CD-ROM drive, which can be more cost-effectively fabricated in simplified processes, and equipment maintenance can be more labor-effectively to implement.

A further objective of the invention is to provide a magnetically suspended CD-ROM drive, without having to concern with problems of mechanical breakdown or gear damage, making the magnetically suspended CD-ROM drive more reliably used with prolonged lifetime.

A further objective of the invention is to provide a magnetically suspended CD-ROM drive, in which soft magnets and coils are relatively less space-occupied, and thereby the magnetically suspended CD-ROM can be made more compact in size.

In accordance with above and other objectives, the present invention proposes a novel magnetically suspended CD-ROM drive, comprising: a support tray, for holding a compact disc; soft magnets, for producing a magnetic force that interacts with a magnetic field formed around coils, so as to position the support tray with respect to the magnetically suspended CD-ROM drive; an electronic circuit, for applying a voltage of continuous polar variation to the coils, so as to generate the magnetic field formed around the coils; a reading module, for reading the compact disc; and a housing, for receiving the support tray, the soft magnets, the coils, the electronic circuit and the reading module therein.

The magnetically suspended CD-ROM drive of the invention is characterized by using magnetic attraction and repulsion forces to move a disc-holding support tray, instead of employing a mechanically-driven gear mechanism used in a conventional CD-ROM drive in the prior art. In particular, the magnetic attraction and repulsion forces are generated by interaction between soft magnets and coils provided in the magnetically suspended CD-ROM drive, and can be directly applied on the support tray for loading or ejecting the support tray held with a compact disc into or out of the magnetically suspended CD-ROM drive. Without using the gear mechanism of the prior art, there is no need to install a read/write head moving device in the magnetically suspended CD-ROM drive of the invention.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
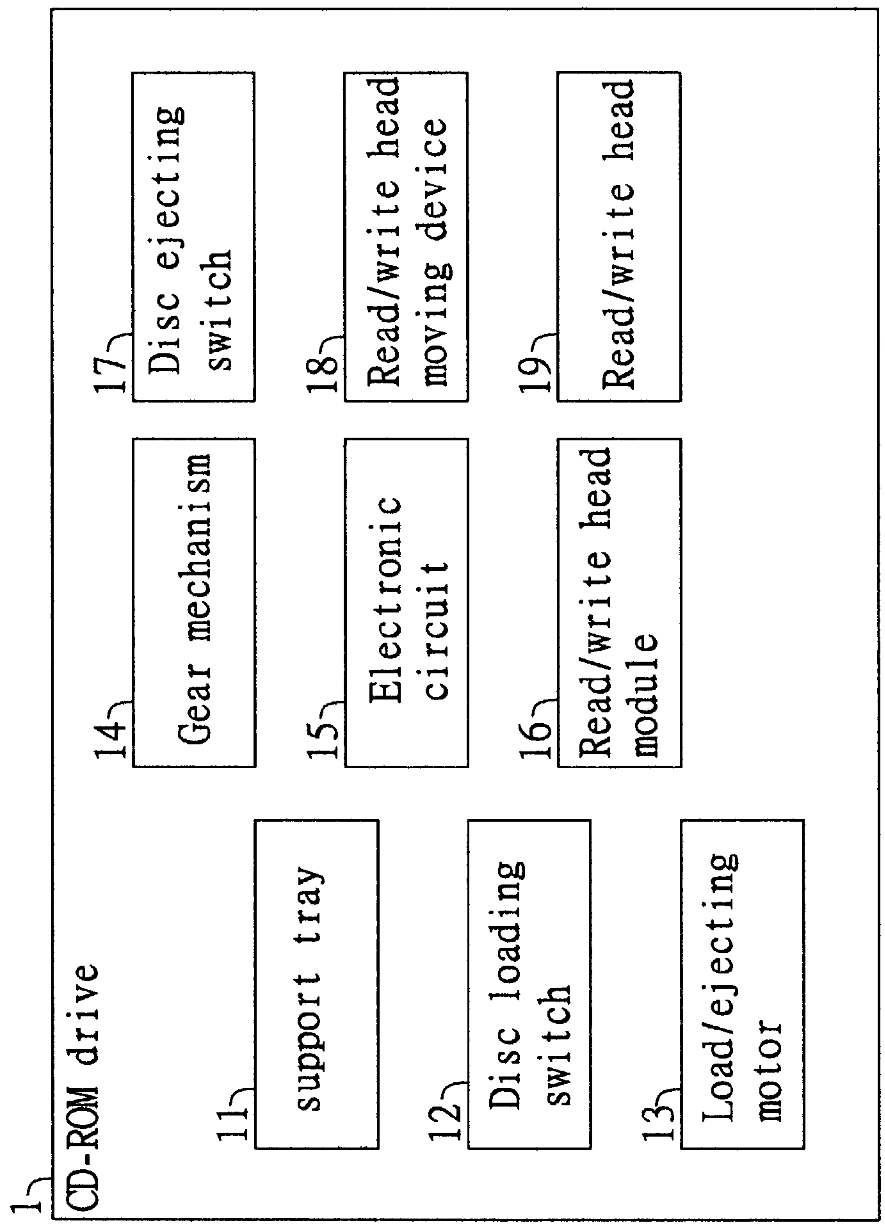
FIG. 1 (PRIOR ART) is a schematic block diagram showing basic components of a conventional CD-ROM drive.
Figure 2:
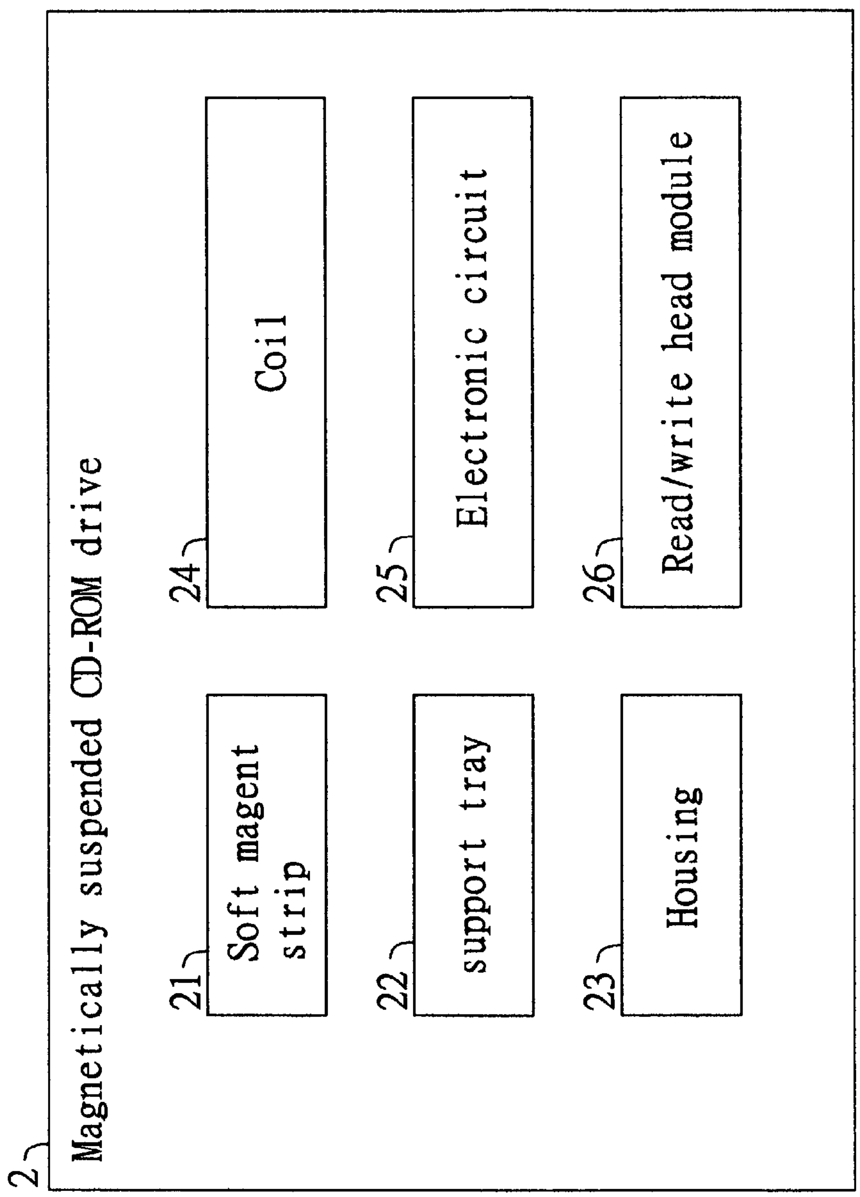
FIG. 2 is a schematic block diagram showing basic components of a magnetically suspended CD-ROM drive of the invention.

FIG. 2 illustrates basic components of a magnetically suspended CD-ROM drive of the present invention. As shown in the drawing, the magnetically suspended CD-ROM drive 2 comprises: a plurality of soft magnet strips 21, a support tray 22 used for holding a compact disc, a housing 23, a plurality of coils 24, an electronic circuit 25 and a read/write head module 26. This magnetically suspended CD-ROM drive 2 is not provided with a read/write head moving device, as not having to use a gear mechanism.

Figure 3:
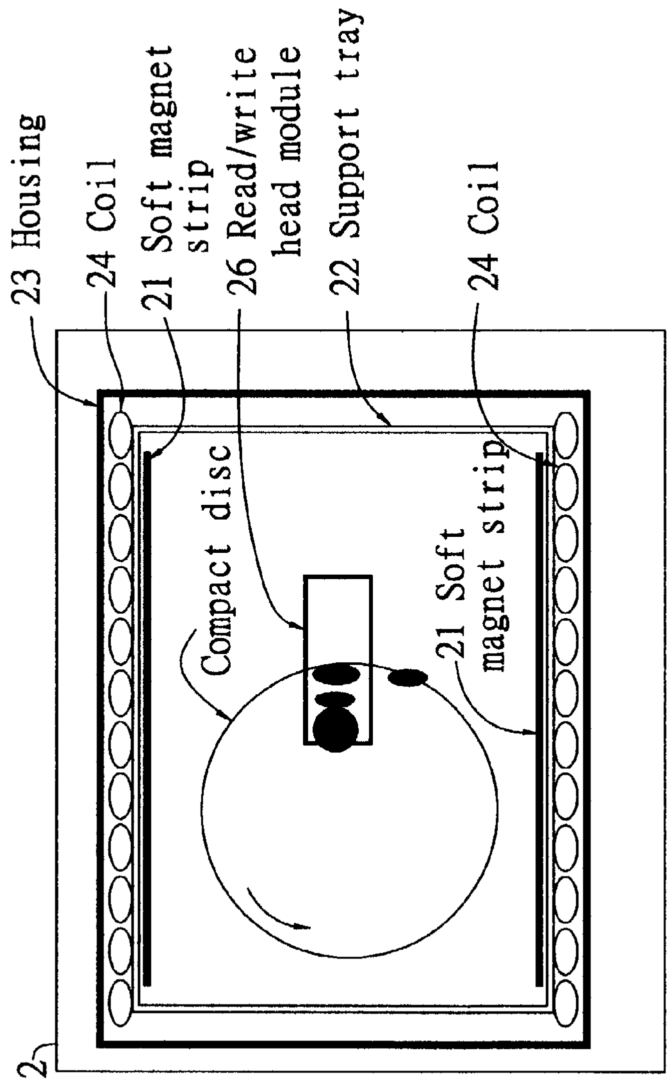
FIG. 3 is a top perspective view showing a compact disc held on a support tray being loaded into the magnetically suspended CD-ROM drive of the invention.

In accompany with reference to FIG. 3, two or more soft magnet strips 21 of the magnetically suspended CD-ROM drive 2, are mounted respectively at two internal sides of the disc-holding support tray 22, for example, along a direction parallel to that of disc loading or ejecting. A plurality of coils 24, e.g. electromagnetic coils, are installed inside the housing 23 and outside the support tray 22, in a manner that the coils 24 are correspondingly positioned in parallel to the soft magnet strips 21. Then, voltages of continuous polar variations can be applied from the electronic circuit 25 to the coils 24, so as to generate a magnetic field with continuous changes in polarity (from S pole to N pole, or from N pole to S pole) around every two of the coils 24.

The soft magnet strips 21 can be made of a ferrite material generally used for manufacturing a motor or a transformer. The coils 24 are made of same material as coils used in the motor; but in this embodiment, the coils 24 are arranged in arrays, instead of circularly-arranged coils formed in the motor. As compared to the prior art of using a loading/ejecting motor together with a gear mechanism for mechanically driving a disc-holding support tray, the coils 24 and the soft magnet strips 21 of this invention similarly function but adopt different driving mechanism for moving the support tray 22. For the magnetically suspended CD-ROM drive 2, the electronic circuit 25 is used to produce and apply a variety of voltages to the coils 24, whereby continuously-changed magnetic fields would be created around the coils 24 in response to voltage variation. This physical principle of electrically-induced magnetic fields is substantially same as for a conventional motor; nevertheless, voltage differences in polarity are generated by physical movement or rotation of an armature in the conventional motor. In more detail, the continuously-changed magnetic fields induced around the coils 24 can be modulated by patterning or arrangement of the coils 24, so as to control continuous polar variations of the magnetic fields from N pole to S pole or from S pole to N pole.

Moreover, in comparison with a gear mechanism used in a conventional CD-ROM drive, the coils 24 and the soft magnet strips 21 are summed to be smaller in thickness, thereby making the magnetically suspended CD-ROM drive 2 of this invention relatively smaller in size and less space-occupied.

The electronic circuit 25 can be formed of, but not limited to, a CMOS integrated circuit (model 4017) and an array of transistors, for example; besides, other types of electronic circuit 25 that can generate voltages with desirable polar variations, are also suitably adopted herein. In practical use, it is preferable to make the electronic circuit 25 relatively more simplified in structure and miniaturized in profile.

In operation, loading or ejecting a compact disc held on the support tray 22 can be accomplished by means of magnetic attraction and repulsion that are generated between magnetic fields of continuous polar variations produced around the coils 24 and magnetic forces of the soft magnet strips 21. Further referring to FIG. 3, it illustrates a compact disc held on the support tray 22 being loaded into the magnetically suspended CD-ROM drive 2 of the invention; by the magnetic attraction forces between the coils 24 and the soft magnet strips 21, the support tray 22 can be loaded into the magnetically suspended CD-ROM drive 2, allowing the read/write head module 26 to read the compact disc held on the support tray 22. In this invention, there is no need to move up or down a read/write head of the read/write head module 26, whereas the read/write head is allowed to purely execute the reading of the compact disc at a predetermined position in elevation.

Figure 4:
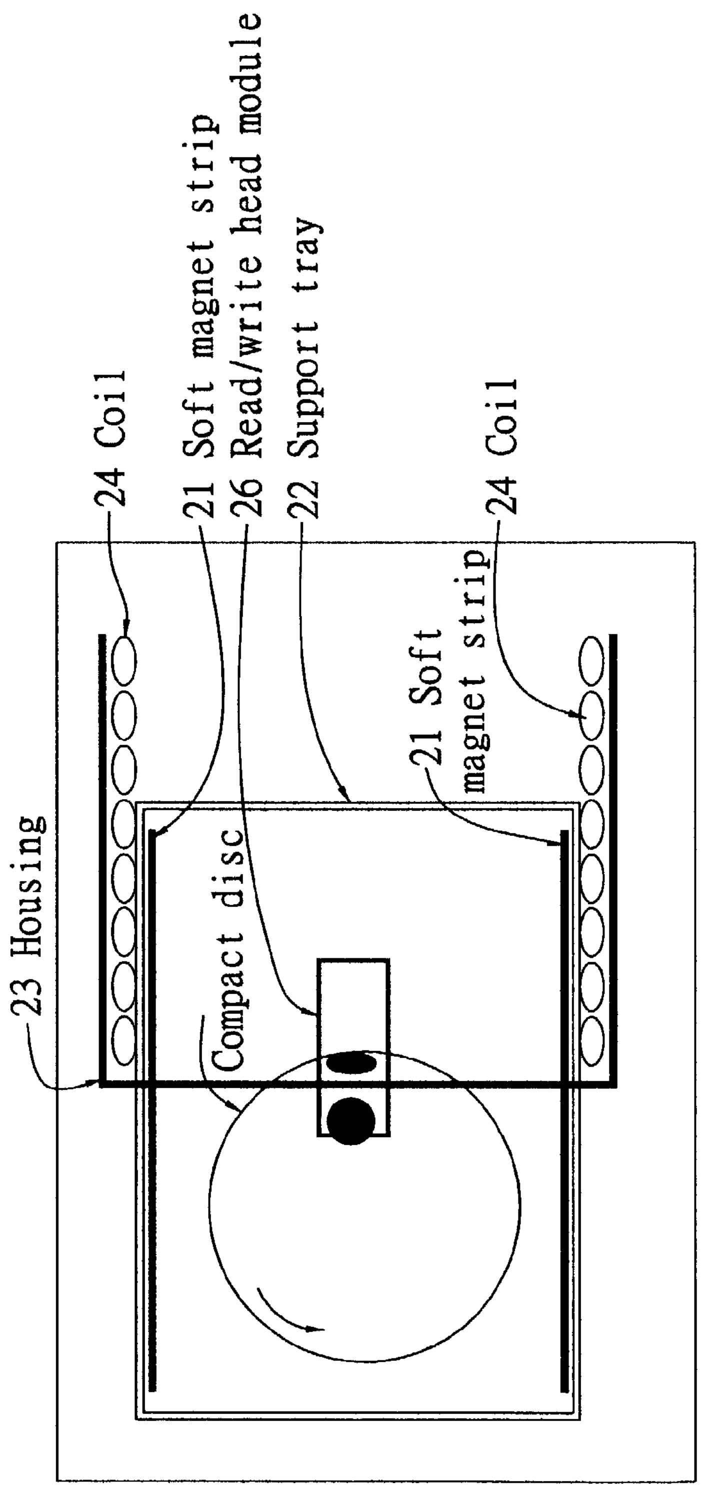
FIG. 4 is a top perspective view showing a compact disc held on a support tray being ejected out of the magnetically suspended CD-ROM drive of the invention.

Moreover, as shown in FIG. 4, it illustrates a compact disc held on the support tray 22 being ejected out of the magnetically suspended CD-ROM drive 2 of the invention; with provision of the magnetic repulsion forces between the coils 24 and the soft magnet strips 21, the support tray 22 can be ejected out of the magnetically suspended CD-ROM drive 2, allowing the compact disc to be removed from the support tray 22, or allowing the support tray 22 to be replaced with another compact disc.

In the above embodiments, it should be understood that, numbers and shapes of soft magnet strips 21 and coils 24 are not particularly limited to those exemplified in the drawings. And, as previously described, the soft magnet strips 21 are primarily disposed on two sides of the support tray 22, and the coils 24 are positioned inside the housing 23 in parallel to the soft magnet strips 21; nevertheless, in practice, positioning and arrangement of the soft magnet strips 21 and coils 24 can be more flexibly adopted. For example, it is possibly feasible to install the coils 24 inside the support tray 22, and dispose the soft magnet strips 21 nearby the support tray 22 but not necessarily inside the housing 23, only if magnetic attraction and repulsion forces are sufficiently generated by the soft magnet strips 21 and coils 24 for moving the support tray 22 to desirable positions.

In conclusion, the magnetically suspended CD-ROM drive of the invention is characterized by using magnetic attraction and repulsion forces to move a disc-holding support tray, instead of employing a mechanically-driven gear mechanism used in a conventional CD-ROM drive in the prior art. In particular, the magnetic attraction and repulsion forces are generated by interaction between soft magnet strips and coils provided in the magnetically suspended CD-ROM drive, and can be directly applied on the support tray for loading or ejecting the support tray held with a compact disc into or out of the magnetically suspended CD-ROM drive. Without using the gear mechanism of the prior art, there is no need to install a read/write head moving device in the magnetically suspended CD-ROM drive of the invention.

Therefore, the magnetically suspended CD-ROM drive of the invention can provide a plurality of significant benefits. First, without having to install a conventional gear mechanism and a read/write head moving device, the magnetically suspended CD-ROM drive can be more cost-effectively fabricated in simplified processes, as well as equipment maintenance can be more labor-effectively to implement. Moreover, further without employing the mechanically-driven gear mechanism for operating disc-loading and disc-ejecting, mechanical breakdown or gear damage is out of concern, making the magnetically suspended CD-ROM drive more reliably used with prolonged lifetime. In addition, as soft magnet strips and coils are relatively less space-occupied, thereby the magnetically suspended CD-ROM can be made more compact in size.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A magnetically suspended CD-ROM drive comprising:

a support tray for holding a compact disc, wherein the support tray is movable along a support tray moving direction between a disc loading position and a disc ejecting position;

at least two soft magnets, each respectively mounted on sides of the support tray along a direction parallel to the support tray moving direction;

a coil means, positioned apart from the soft magnets in a direction perpendicular to the support tray moving direction, for forming a magnetic force that interacts with a magnetic field produced by the soft magnets, so as to movably drive the support tray with respect to the magnetically suspended CD-ROM drive; and;

a housing, for receiving the support tray, the soft magnets and the coil means therein.

2. The magnetically suspended CD-ROM drive of claim 1, further comprising an electronic circuit, for applying a voltage of continuous polar variation to the coil means, so as to generate the magnetic field with continuous changes in polarity around the coil means.

3. The magnetically suspended CD-ROM drive of claim 1, wherein the coil means includes at least two coils, allowing the magnetic field interacting with the magnetic force from the soft magnets to generate magnetic attraction and repulsion force for moving the support tray to predetermined positions with respect to the magnetically suspended CD-ROM drive.

4. The magnetically suspended CD-ROM drive of claim 1, wherein the soft magnets are strip-shaped and arranged in a direction parallel to that of the coil means.

5. The magnetically suspended CD-ROM drive of claim 2, wherein the electronic circuit is formed of a CMOS integrated circuit and an array of transistors.

6. The magnetically suspended CD-ROM drive of claim 1, further comprising:

a reading module received in the housing, for reading the compact disc.

* * * * *